United States Patent [19]

Yang

[11] Patent Number: 5,254,929
[45] Date of Patent: Oct. 19, 1993

[54] INTERMEDIATE STORAGE BATTERY CHARGING SYSTEM

[76] Inventor: Tai-Her Yang, 5-1 Taipin St., Si-Hu Town, Dzan-Hwa, Taiwan

[21] Appl. No.: 863,237

[22] Filed: Apr. 3, 1992

[51] Int. Cl.⁵ .............................................. H02J 7/00
[52] U.S. Cl. .......................................... 320/15; 320/6
[58] Field of Search ................ 320/5, 6, 7, 8, 15, 320/17, 18, 37, 38, 61

[56] References Cited

U.S. PATENT DOCUMENTS

| | | | |
|---|---|---|---|
| 3,798,527 | 3/1974 | Du Plessix et al. | 320/6 |
| 4,218,644 | 8/1980 | Bourke et al. | 320/37 X |
| 4,612,492 | 9/1986 | Burk | 320/6 X |
| 4,983,904 | 1/1991 | Iwahashi | 320/15 |
| 5,119,010 | 6/1992 | Shirata et al. | 320/15 |

*Primary Examiner*—Kristine L. Peckman
*Attorney, Agent, or Firm*—Leonard Bloom

[57] ABSTRACT

A high-efficiency reserve power battery charging system for a power plant or the like which stores a reserve charge in a rechargeable external battery. The system incorporates an intermediate storage battery and a charging control device for selectively storing charge in the intermediate storage battery during non-peak hours for later assistance in charging the external battery during peak hours.

8 Claims, 2 Drawing Sheets

INTERMEDIATE STORAGE BATTERY CHARGING SYSTEM

BACKGROUND OF THE INVENTION

1. Field of the Invention

The present invention relates to a battery charging system for storing a reserve charge in backup of a power plant or the like. More specifically, the invention relates to a high-efficiency battery charging system including a charging control device which selectively stores charge in an intermediate relay battery during non-peak hours for later assistance in charging an external battery during peak hours.

2. Description of the Background

Currently, electrical power is generated by the conversion of a variety of energies such as thermal, hydraulic, nuclear, wind, geothermal, wave, solar energy, etc. Regardless of the source, the destination presents a conventional problem, i.e. the demand varies between peak hours and non-peak hours. Often there is an intermediate power storage system to meet the variation in demand.

One type of conventional battery storage system converts raw AC power into DC for charging an intermediate storage (or relay) battery during non-peak hours. The stored DC power can then be used at a later time during peak hours.

SUMMARY OF THE INVENTION

An object of the present invention is to increase the efficiency of a battery storage system which incorporates an intermediate storage battery, and to accomplish charging at faster speed.

According to the present invention the above-described and other objects are accomplished by providing an intermediate storage charging system which includes an AC input power supply and a rectifier selectively connectable to the AC power supply for generating a first charging current. In addition, an intermediate storage battery is connected to the rectifier output and is chargeable thereby from the first charging current for generating its own second charging current. A cyclic timing control device is connected between the AC input power supply and the rectifier for sensing the existing charge on the intermediate storage battery. The cyclic timing control circuit operates to connect the AC input power supply to the rectifier only during a preset time interval of non-peak power consumption and while an existing charge on said intermediate storage battery does not exceed a preset saturation level. If the constraints are not met and connection is not made, one or more terminal storage batteries will be charged exclusively by the second charging current of said intermediate storage battery during times of peak power consumption. This serves to level consumption of power from the AC supply.

BRIEF DESCRIPTION OF THE DRAWINGS

Other objects, features, and advantages of the present invention will become more apparent from the following detailed description of preferred embodiments and certain modifications thereof when taken together with the accompanying drawings in which.

DETAILED DESCRIPTION OF THE INVENTION

Figure 1:
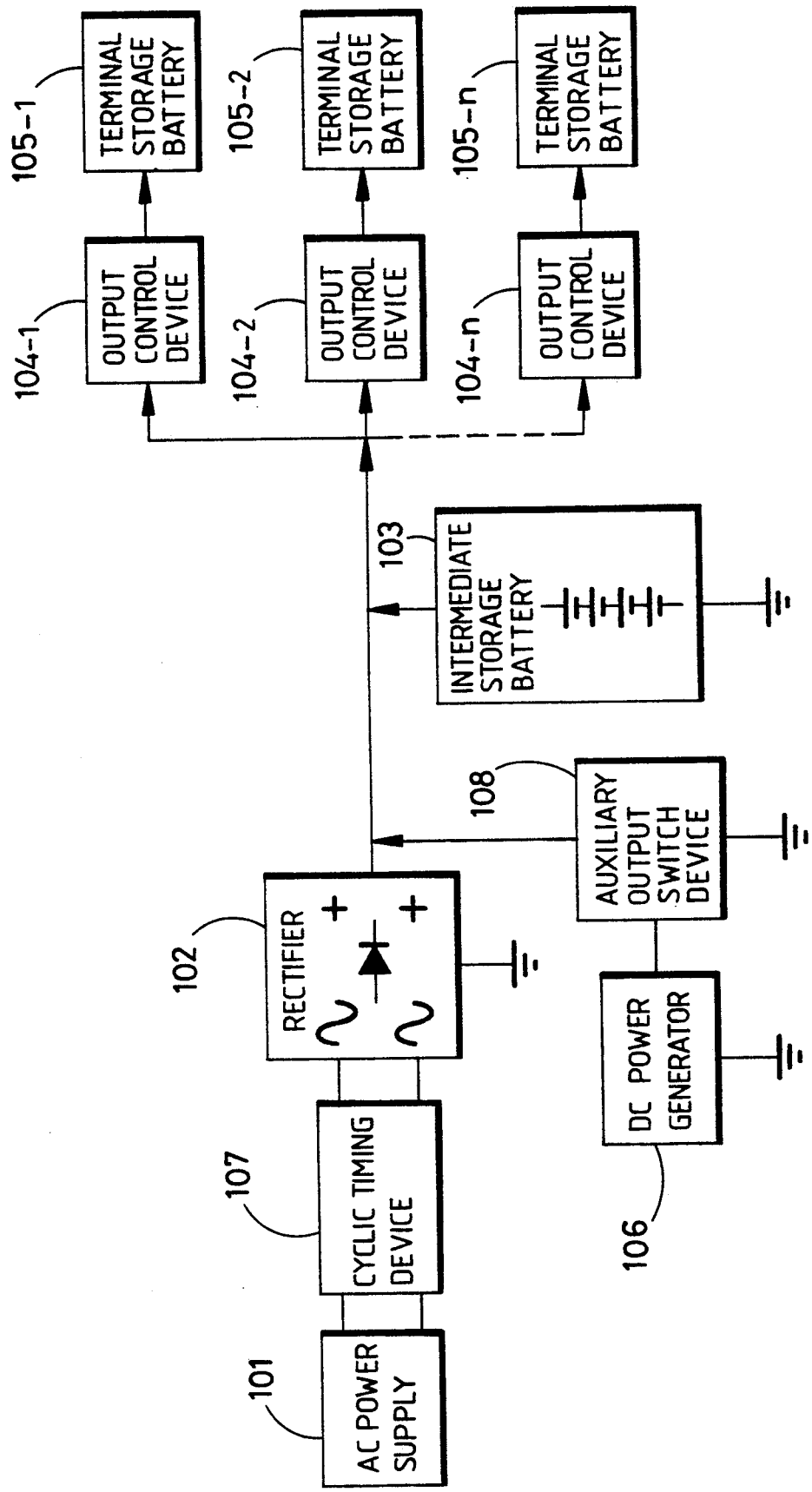
FIG. 1 is a block diagram showing an intermediate storage battery charging system in accordance with the present invention.

Referring to FIG. 1, one embodiment of an intermediate storage charging system in accordance with the present invention will herein be described. The charging system includes a monophase or polyphase AC power supply 101 connected in parallel through a rectifier 102 to intermediate storage battery 103 for charging said intermediate storage battery 103 with a DC signal. It should be appreciated by those skilled in the art that the combination AC source 101 and rectifier 102 could be replaced by a DC power generator for charging the intermediate storage battery 103, and such is considered to be within the scope of the invention.

In addition, the present invention includes a cyclic timing device 107 connected as shown in parallel between AC source 101 and rectifier 102. The cyclic timing device 107 controls the application of AC source 101 to rectifier 102 and relay battery 103 in accordance with the predetermined peak and non-peak intervals of power usage, and in accordance with the amount of existing charge on intermediate storage battery 103. The cyclic timing device 107 disconnects the AC source 101 during peak periods of demand so that all charging current is drawn from the residual charge in relay battery 103. Conversely, during periods of non-peak demand, the cyclic timing device 107 applies the AC source 101 so that charging current will be drawn from the AC source 101 in addition to the intermediate storage battery 103.

The output of the intermediate storage battery 103 is ultimately connected to one or more external batteries (or like loads) 105-1 ... n such that the system may function to charge a plurality of batteries simultaneously. The output of the intermediate storage battery 103 may be connected to each of the external batteries 105-1 ... n through a corresponding output control device 104-1 ... n. The output control devices 104-1 ... n may be charge-time controllers, charging voltage and/or current controllers, measuring devices, etc.

The system operates such that non-peak-hour power in the evening is used for charging relay battery 103. The relay battery is then useable for charging the external batteries. This storage of non-peak-hour power to fuel peak hour demands not only increases the efficiency of power consumption for the charging system, but may also accomplish charging at a faster speed.

Rectifier 102 is a conventional device for converting AC power from source 101 into DC power with the necessary voltage for charging external batteries 105-1 ... n. Preferably, a voltage/current display and control capability is included in the rectifying device 102.

The intermediate storage battery 103 comprises a rechargeable battery for receiving stored electrical energy from the rectifier 102 and for discharging its stored charge to external batteries 105-1 ... n (or other kind of load) through the corresponding output control devices 104-1 ... n. Each output control device 104-1 ... n is connected between the relay battery 103 and a corresponding one of external batteries (or loads) 105-1 ... n.

The output control devices 104-1 ... n may include any number of conventional battery charger optional devices, including programmable charge time control devices, adjustable voltage and/or current control devices, output voltage/current measuring devices, motor or other starting devices, and/or devices for detecting the saturation and/or polarity of the charged external batteries 105-1 ... n.

An optional second source of input power may also be included. An exemplary DC power supply unit is shown in FIG. 1 to comprise a DC power generator 106 and an auxiliary output switch device 108. DC power generator 106 may be any conventional electromechanical generator for producing a DC output, and auxiliary switch los is connected in series between the output of generator 106 and output control devices 104127-1 ... n to selectively apply generator 106 thereto. Auxiliary switch 108 controls charging of intermediate storage battery 103 by regulated AC source 101 alone, or in parallel with DC generator 106.

Figure 2:
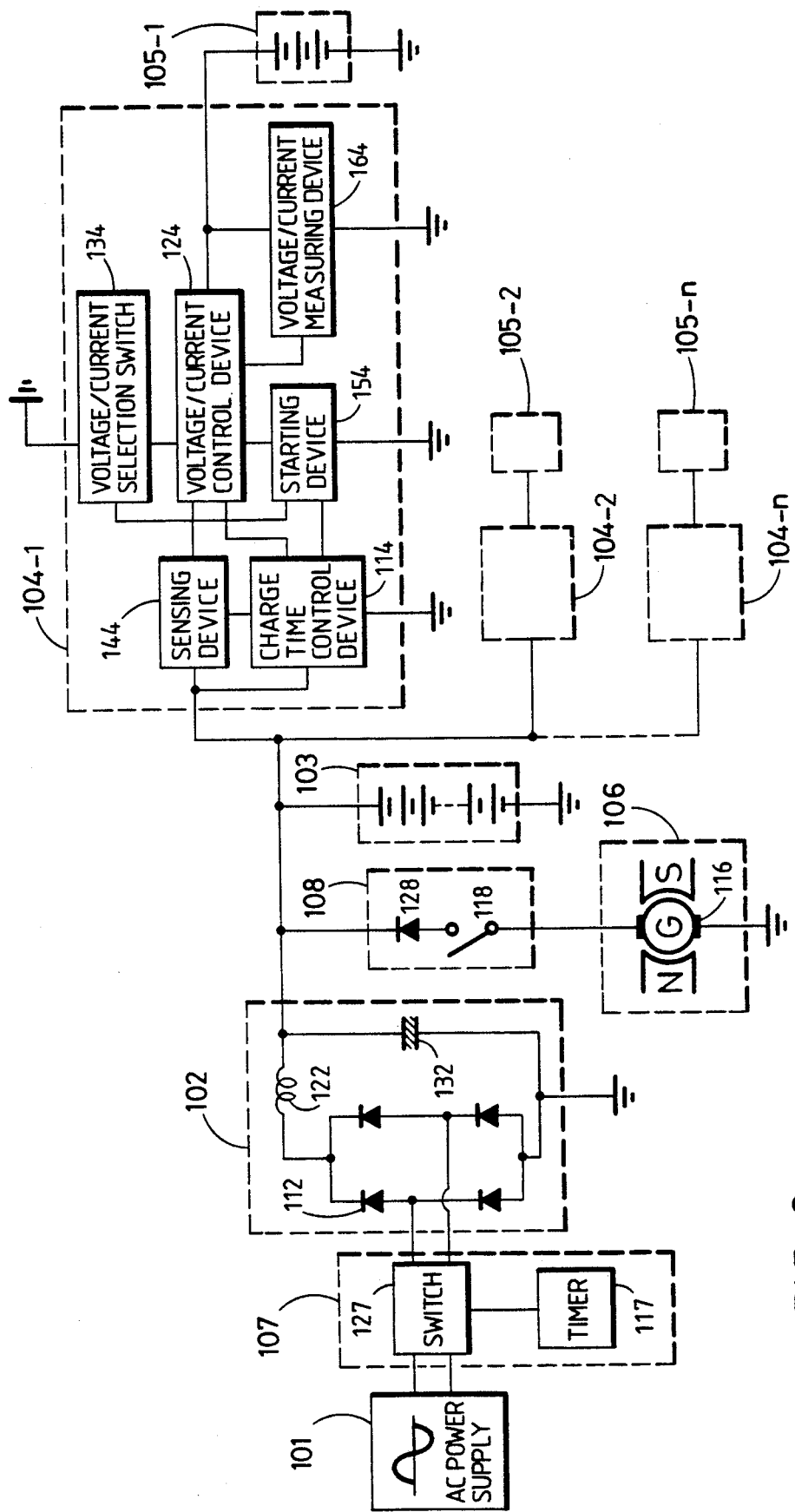
FIG. 2 shows a suitable circuit schematic for the battery charging system of FIG. 1.

The cyclic timing control device 107 is provided to control the non-peak-hour charge time of intermediate storage battery 103. Cyclic timing control device also senses the residual electrical energy already stored in intermediate storage battery 103 and controls charging in accordance therewith. The cyclic timing control device comprises an electro-mechanical or solid state electronic timing circuit (programmable by day, week, month or year). The cyclic timing control circuit 107 applies the charging AC source 101 to the intermediate storage battery in accordance with the following conditions:

1. When the intermediate storage battery 103 charge is less than a preset saturation value, and the present time is during a preset non-peak-hour setting time, charge from the AC source 101 will be transmitted to rectifier 107.
2. When the intermediate storage battery 103 charge exceeds a preset saturation value, no charge is transmitted as described above;
3. When the present time is during a preset peak hour setting time, no charge is transmitted regardless of the existing charge on intermediate storage battery 103;

FIG. 2 shows a suitable detailed circuit schematic for the above charging system.

Cyclic timing control device 107 further comprises an electro-mechanical or solid state switch 127 which is controlled by timer 117 for selectively applying AC source 101 to the rectifying device 102 during the preset interval of non-peak-hour power consumption as described in the foregoing conditions.

The rectifying device 102 further comprises a conventional diode bridge rectifier 112 with a filter inductance 122 and a filter capacitance 132.

The DC power supply further comprises a DC power generator 106 and an auxiliary output switch device 108. Auxiliary switch device 108 is preferably a manual or electro-mechanical control switch 118 connected in series with a reverse blocking diode 128.

The intermediate storage battery 103 may comprise a plurality of rechargeable batteries.

The output control devices 104-1 ... n are each shown to include a programmable charge time control device 114, an adjustable voltage and current control device 124, an output voltage/current selection switch 134, an output voltage/current measuring device 164, a starting device 154, and a sensing device 144 for detecting the saturation and/or polarity of the charged external batteries 105-1 ... n. All of devices 114-164 which make up the output control devices 104 are conventional battery-charging components which would be well-known to those skilled in the art.

To conclude the above description, the invention provides a high-efficiency charging system which charges an intermediate storage battery 103 only during non-peak-hours.

The advantage of the present invention lies in using non-peak-hour power in the evening for charging the intermediate storage battery 103, and thus using the intermediate storage battery 103 for charging one or more external batteries or other loads 105-1 ... n. This not only stores non-peak-hour power to level out the overall power consumption for the system in the face of varying demand, but may also accomplish charging at a faster speed Having now fully set forth the preferred embodiments and certain modifications of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

I claim:

1. An intermediate storage charging system, comprising:
   an AC input power supply;
   a rectifier selectively connectable to said AC power supply for generating a first charging current therefrom;
   an intermediate storage battery for generating a second charging current, said intermediate storage battery being connected to an output of said rectifier and chargeable thereby from said first charging current;
   a cyclic timing control device connected between said AC input power supply and said rectifier for sending an existing charge on said intermediate storage battery and for connecting said AC input power supply to said rectifier only during a preset time interval of non-peak power consumption and while said existing charge on said intermediate storage battery does not exceed a preset saturation level; and
   at least one terminal storage battery coupled to the interconnected of said intermediate storage battery and the output of said rectifier and charged thereby from said first and second charging currents, said terminal storage battery being charged exclusively by the second charging current of said intermediate storage battery during times of peak power consumption to thereby level consumption of said first changing current.

2. The intermediate storage charging system according to claim 1, wherein said AC input power supply further comprises a monophase AC power supply.

3. The intermediate storage charging system according to claim 1, wherein said AC input power supply further comprises a multiple-phase AC power supply.

4. The intermediate storage charging system according to claim 1, wherein said rectifier further comprises a full diode bridge.

5. The intermediate storage charging system according to claim 1, wherein said cyclic timing control device further comprises a programmable timer for determining said preset time interval of non-peak power consumption, and a sensor for sensing said existing charge on said intermediate storage battery.

6. The intermediate storage charging system according to claim 1, wherein said at least one terminal storage battery further comprises a plurality of rechargeable storage batteries each coupled to the output of said rectifier, whereby the system may function to charge the plurality of terminal storage batteries simultaneously.

7. The intermediate storage charging system according to claim 1, further comprising an output control device connected between each of the plurality of terminal storage batteries and the output of said rectifier, said output control devices being one from among a group of charge-time controllers, charging voltage controllers, charging current controllers, and output measuring devices.

8. The intermediate storage charging system according to claim 1, further comprising an auxiliary DC input source selectively connectable to the interconnection of said intermediate storage battery, rectifier output, and terminal storage battery for generating a third charging current.

* * * * *